Dec. 16, 1969     N. H. HAENKY     3,484,078
VALVE
Filed July 1, 1966     2 Sheets-Sheet 1
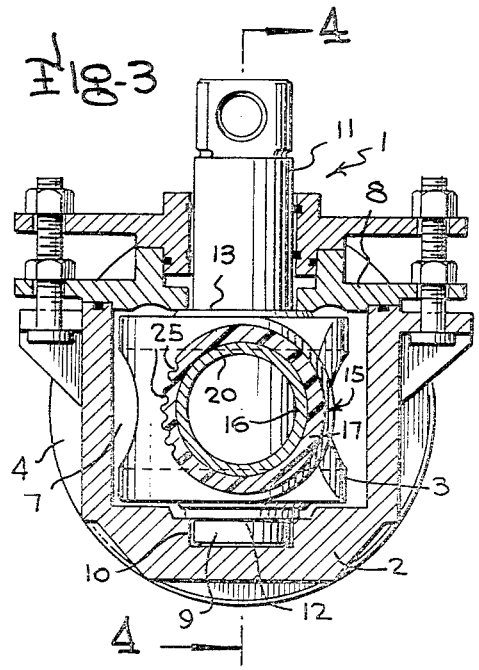
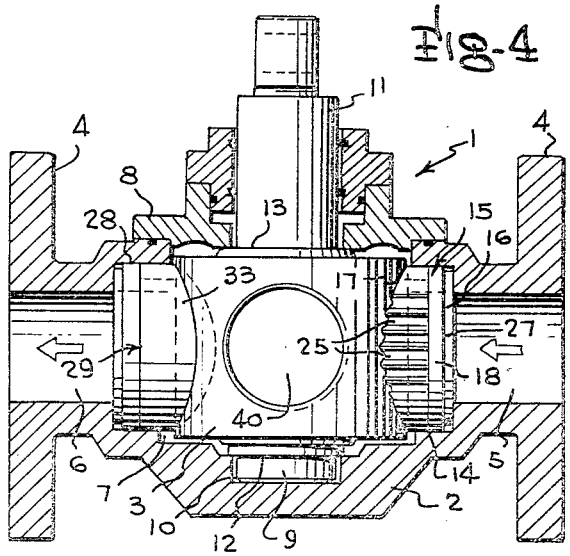
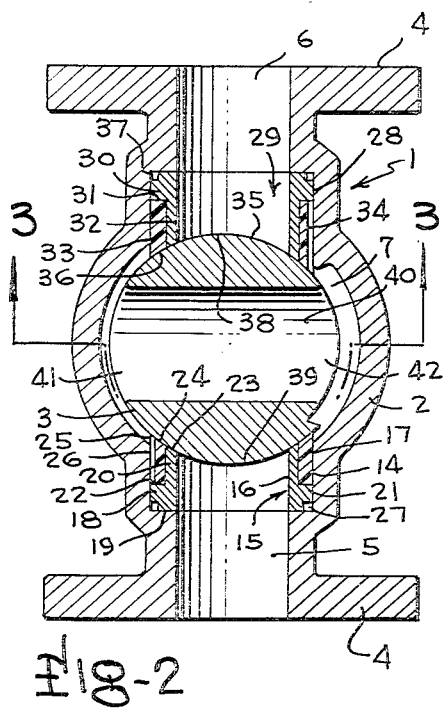
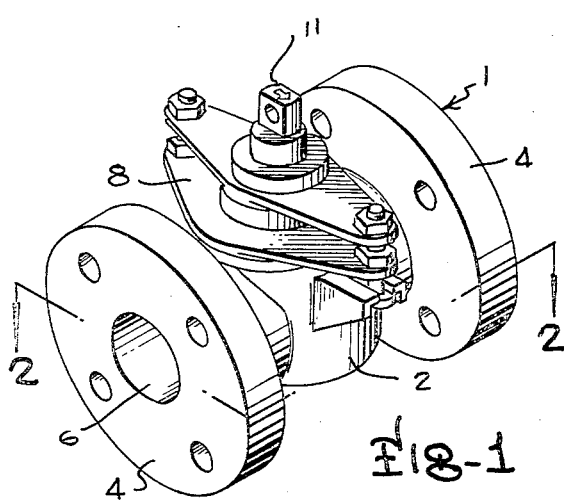
INVENTOR
NORMAN H. HAENKY
BY Mason, Fenwick & Lawrence
ATTORNEYS Dec. 16, 1969

N. H. HAENKY 3,484,078

VALVE

Filed July 1, 1966

INVENTOR

NORMAN H. HAENKY

BY Mason, Fenwick & Lawrence

ATTORNEYS

United States Patent Office 3,484,078
Patented Dec. 16, 1969

3,484,078
VALVE
Norman H. Haenky, 4418 S. Sandusky,
Tulsa, Okla. 74135
Filed July 1, 1966, Ser. No. 562,147
The portion of the term of the patent subsequent
to May 30, 1984, has been disclaimed
Int. Cl. F16k 5/00, 25/00, 25/02
U.S. Cl. 251—210    3 Claims

ABSTRACT OF THE DISCLOSURE

A plug valve having an eccentrically shaped plug. A seat adjacent the inlet having a two part seal assembly therein. The seal assembly including an inner annular insert of non-deformable material forming a continuation of the inlet and an annular seal of deformable material surrounding the insert and projecting beyond the insert into the area of the plug.

---

Figure 5:
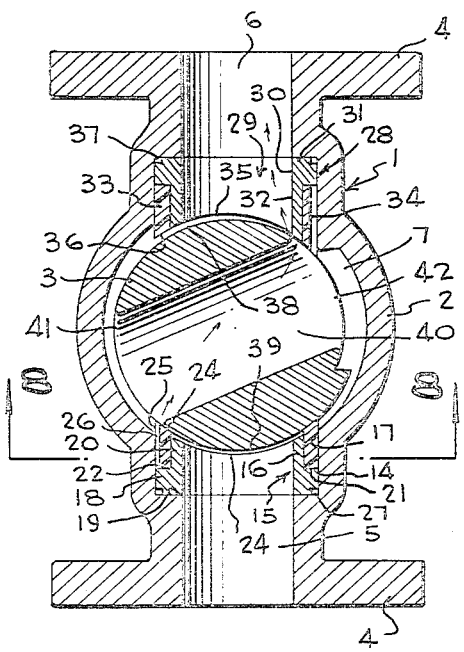

This invention relates to valves of the plug type, and more particularly to improvements in the valves of the type disclosed in my co-pending application S.N. 321,778, filed Nov. 6, 1963, now Patent No. 3,322,149.

In my co-pending application, a plug type valve having at least one resilient seal encircling the outlet end of the inlet passage adjacent the plug for pressure contact with the plug was shown. The plug had an eccentric portion to cooperate with a cam at the inlet end of the outlet passage adjacent the plug to force the plug into pressure contact with the seal. The seal had a plurality of axially extending openings to assist in the sealing operation and to provide for minimum quantity flow control. While this valve is very effective in normal operations, there is some likelihood of disruption of the seal under extreme heat conditions, thereby making it impossible to completely shut off the valve. There is also some momentary pressure build-up at points adjacent the seals during movement of the plug to open or closed position, tending to force the seal between the plug and the body.

The general object of the present invention is to provide a plug type valve, of the general type set out above, which will be operable under all conditions to provide a proper closure seal and to maintain the seal in its intended position.

A more specific object of the invention is to provide a plug of this character which contains a double seal, one being resilient and deformable to provide a primary seal, and the other being rigid and resistant to high heat to form a secondary seal.

Another object of the invention is the provision of a plug valve having seals at both the upstream and downstream sides of the plug, which will permit reversal of flow, with means to support the seals from internal pressure in case of failure of the upstream seal, irrespective of the direction of flow.

A further object of the invention is to provide such a plug valve wherein the seals are so constructed that a momentary pressure build-up which might tend to force the seal between the plug and body is automatically relieved, thus saving the seal from rupture.

Other objects of the invention will become apparent from the following description of one practical embodiment thereof, when taken in conjunction with the drawings which accompany, and form part of, this specification.

Figure 8:
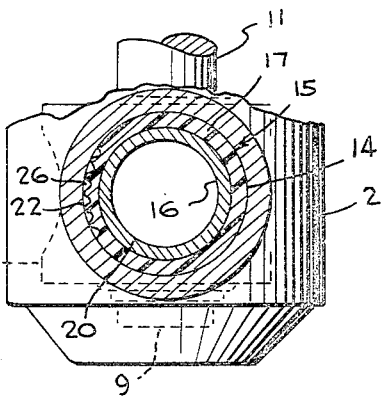
Figure 6:
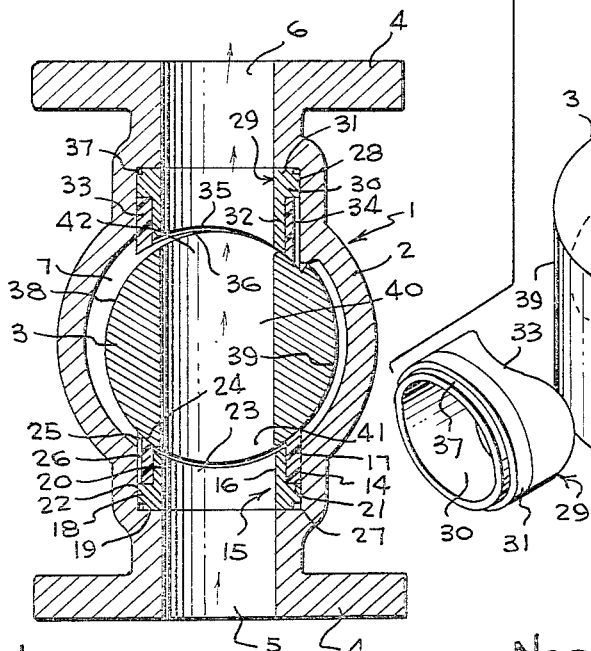
Figure 7:
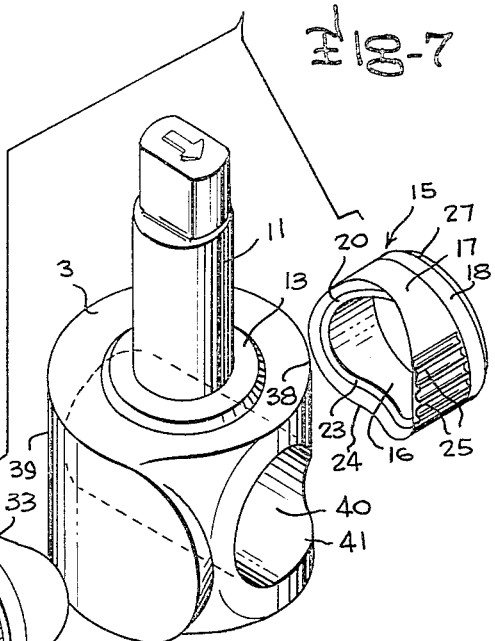

In the drawings:
FIGURE 1 is a perspective view of a plug valve of the type employing the features of the present invention;
FIGURE 2 is a longitudinal, central section, taken on the line 2—2 of FIGURE 1;

FIGURE 3 is a transverse section through the valve casing, with the plug being shown in elevation, and is taken on the line 3—3 of FIGURE 2;
FIGURE 4 is a vertical central section taken on the line 4—4 of FIGURE 3, the plug and seals being shown in elevation;
FIGURE 5 is a central, longitudinal section, similar to FIGURE 2, but with the plug being shown in an intermediate position between fully open and fully closed;
FIGURE 6 is a similar section with the plug in fully opened position;
FIGURE 7 is a perspective view of the plug and seal assemblies, with the seal assemblies spaced slightly from the plug; and
FIGURE 8 is a transverse section through the seal assembly and casing, taken on the line 8—8 of FIGURE 5.

Referring to the drawings in detail, there is shown a plug valve 1 having a body 2 with a plug 3 rotatably mounted within the body. The body has the usual end flanges 4, inlet and outlet passages 5 and 6, and plug chamber 7, with the inlet and outlet passages aligned and diametrically arranged relative to the plug chamber. The plug chamber is open through the top of the body and is closed by a suitable cover 8.

Plug 3 has a bottom trunnion 9 which is rotatably seated in a recess 10 in the bottom of the plug chamber of the body. Stem 11 rises from the top of the plug and extends through the cover 8. The plug bottom and top surfaces are offset slightly, adjacent the juncture with the trunnion and stem, to provide relatively narrow width annular surfaces 12 and 13 for contact with the plug chamber bottom and body cover respectively. The stem and trunnion are in axial alignment and provide the journaled members for fixing the axis of rotation of the plug. As the plug and plug chamber are designed to permit rotation of the plug without contact with the chamber walls, the only contact of the plug with the valve body is by means of the surfaces 12 and 13. This arrangement prevents corrosion lock when corrosive fluids are being controlled by the valve.

The inlet passage 5 is enlarged at its end adjacent the plug, forming an annular recess about the passage to provide a seat 14 to receive a seal assembly 15. The seal assembly is cylindrical, having an outer diameter approximating that of seat 14, and an inner diameter equal to the diameter of the inlet passage to form a continuation of that passage.

Seal assembly 15 is composed of an annular metal insert 16 and an annular deformable seal 17. The metal insert has a base section 18, having an outer diameter approximating that of the seal seat 14, and an inner diameter equal to that of the inlet 5. The base portion has a bottom 19 which rests upon the seal seat 14. A collar 20 projects concentrically from the base, and is of less wall thickness than the base portion. As the inner wall of the base and collar is a continuous one, the reduced cross-section of the collar leaves an annular space 21 between the outer wall of the collar and the circular wall 22 of the seal seat 14. It is within this space 21 that the deformable seal 17 is positioned. The annular esal 17 is of such thickness that it will be in contact with the outer wall of the insert collar 20 and the circular wall 22 of the seal seat 14. The edges of the insert and the deformable seal adjacent the plug 3 are concave in a horizontal direction. The arc of curvature is struck from the rotational center of the plug 3. The arcuate edge of the deformable seal will project slightly beyond the matching edge of the metal insert to allow for compression of the deformable member by the plug prior to contact with the metal insert, as will be described. Both the metal insert and the deformable seal project slightly beyond the inlet opening into the plug chamber 7. The arcuate edges of the insert and deformable seal are shown at 23 and 24, respectively.

In order to relieve pressures which momentarily build up between the back of the deformable seal and the metal insert during opening and closing of the valve, the deformable seal has a portion of its outer surface grooved longitudinally to provide a plurality of parallel grooves 25. When the seal assembly is in position in the seal seat 14, grooves 25 form with the wall 22 of the seat a series of parallel passageways 26 which will permit passage of fluid to relieve pressure as will be described.

In some instances it may be desired to provide for extra sealing between the metal insert and the valve body, and the metal insert base section 18 may be rabbeted around its bottom outer edge to provide a seat 27 in which an O-ring (not shown) may be seated.

The outlet passage 6 also has a seal seat 28 adjacent the plug chamber. A seal assembly 29, which is identical to the seal assembly 15 except for the contour of its curved edges, is positioned within the seal seat 28. Seal assembly 29 has a metal insert 30, including a base 31 and collar 32, which carries a deformable seal 33 having grooves 34 along a portion of its surface. The metal insert and deformable seal have similar arcuate edges 35 and 36, respectively, but the concavity of the edges is laterally offset from the central axis of the seal and of the outlet passage. In other words, the center from which the arcuate concave surface is struck is offset from the projected central axis of the seal, so that the seal is thicker at one side edge than the other and the curvature of the seal is eccentric to the rotational axis of the plug. Thus, seal assembly 29 provides a camming surface for the plug, as will be described. The base of the metal insert 30 may also have an annular seat 37 to receive an O-ring if desired.

In order to obtain full advantage of the cam surfaced seal assembly 29, plug 3 is also provided with an eccentric surface to coact with the eccentric, concave surface of the seal. As most plug valves are limited to approximately 90° of rotation from fully open to fully closed position, it is not necessary for the plug to have more than one-half of its surface eccentric to the rotational axis of the plug. In most cases, the eccentric portion will be greater than one-quarter, but less than one-half, the extent of the circumference of the plug. The eccentricity is obtained by striking the arc of a portion of the plug's surface from a center which is slightly offset from the rotational axis of the plug, and the remainder of the surface from the rotational center. The eccentric portion 38 is of less distance from the center of rotation than the concentric portion 39, and is located generally in the area of the plug which will move across the face of the outlet seal assembly 29 as the plug is rotated from open to closed position.

It is to be noted that the plug is slightly smaller than the chamber in which it is seated, so that there is no contact between the plug circumferential surface and the cylindrical wall of the plug chamber. This allows some movement of the plug under the camming influence of the offset seal assembly 29 and the eccentric surface of the plug to compress and release the seal assemblies. The same play will be required for the stem, so that the necessary bodily shifting of the plug for sealing purposes may be obtained.

The valve will be operated as any conventional plug valve. When the valve is opened for free flow, the plug port 40 will have its inlet end 41 in alignment with the inlet passage 5 of the body, and its outlet end 42 in alignment with the outlet passage 6 of the body. At this time, there will be no sealing pressure between the plug and the seals 15 and 29, and the plug will be out of contact with the walls of the plug chamber 7. This position of the valve is shown in FIGURE 6 of the drawings. Turning the plug approximately 90° will rotate the plug port out of registry with the valve body passages and cause the eccentric plug surfaces 38 to move into camming relation with the offset concavity in the seal assembly 29, forcing the plug into sealing engagement with seal assembly 15 and with seal assembly 29. This position of the valve is shown in FIGURE 2 of the drawings. These are the two extreme positions of the valve.

As the plug begins its rotation from fully open to fully closed position, the eccentric portion 38 will first contact the arcuate edge 36 of the deformable seal of the assembly 29. As pressure increases between the plug and the seal 29, seal 29 will be compressed into its recess until its edge becomes a continuation of the arcuate edge 35 of the metal insert 30, whereupon the eccentric portion of the plug will cam against the insert edge 35. Pressure of the plug against the insert arcuate edge 35 will force the plug laterally into engagement with the deformable seal 17 of the assembly 15. As pressure builds, seal 17 will compress, and the concentric surface 39 of plug 3 will come into sealing contact with the arcuate edge 23 of the metal insert 16. At this time, both deformable seals 17 and 33 will be compressed, forming primary seals at the inlet and outlet ends of the plug chamber. At the same time, the plug will be in pressure sealing contact with the metal inserts 16 and 30 at the inlet and outlet ends of the plug chamber to provide secondary seals at these points. Thus, if the primary seal at either end, or both ends, should fail, the secondary seals would be effective to stop flow through the valve. Such failure of the primary seals might be occasioned by fire, abrasions or other damage.

FIGURE 5 of the drawing shows the plug in the position it would assume in moving either from open to closed, or closed to open, position. At this time, the plug wall is not in sealing contact with the metal inserts at either end of the valve, and is not in contact with the deformable seal 33 at the outlet end of the valve. Consequently, the deformable seals 17 and 33 project beyond the edges of the metal inserts. It is at this point in the operation that pressure builds up against the projecting upper, inner wall of the deformable seal 17 (at the left side of the seal as shown in FIGURE 5) and against the inner, projecting wall of the deformable seal 33 (as seen at the right hand side of deformable seal 33 in FIGURE 5). This momentary pressure build-up tends to force the seals laterally out of their recesses and into the plug chamber. It is at this point in the operation that the grooves on the outer surfaces of the deformable seals come into play, for the pressure behind the seals can move down between the deformable seals and the inserts and escape through the passageways formed by the grooves. By this arrangement the life of the deformable seals can be appreciably lengthened and the likelihood of improper sealing eliminated.

While the normal flow of fluid through the valve is from the inlet end 5 through the outlet end 6, as indicated by the arrows on the drawings, it will be obvious that the flow can be reversed as sealing takes place on both sides of the plug port. Irrespective of the direction of flow, double seals are formed at each end of the port to positively cut off the flow when the port is rotated to closed position. It is also obvious that the pressure released by means of the grooves in the deformable seals will be operative with fluid flow in either direction, as the pressure points are on opposite sides of the two deformable seals and the same action will occur with flow in either direction. Due to the fact that the pressure build-up behind the deformable seals is at one side of the seals only, it is sufficient to have the series of grooves extend around only that portion of the seal which is to be exposed to the plug port 40 during the opening or closing operation.

While in the above one practical embodiment of the invention has been disclosed, it will be understood that the precise details of structure shown and described are merely for purposes of illustration and the invention may take other forms within the scope of the appended claims.

What is claimed is:

1. In a valve having a body with inlet and outlet passages communicating with a plug chamber in which a plug having a through port is mounted for rotation to position the plug port in and out of registry with the inlet and outlet passages of the body, the improvement comprising, the inlet passage having a seat adjacent and opening to the plug chamber, a two part seal assembly in the seat and projecting into the plug chamber for contact with the plug when the plug port is out of registry with the inlet and outlet passages, the seal assembly including an inner annular insert of non-deformable material forming a continuation of the inlet passage and an annular seal of deformable material surrounding the insert and projecting beyond the insert into the plug chamber, the insert and seal having concave faces at the plug chamber side for sealing engagement with the plug, and means to force the plug against the seal assembly as the plug is turned to position the plug port out of registry with the inlet and outlet passages, to first compress the deformable seal to the concave face of the insert and then make sealing contact with the insert, wherein, the means to force the plug against the seal assembly is in part a cam and in part an eccentric surface section of the plug.

2. A valve as claimed in claim 1 wherein, the outlet passage has a seat, and there is a similar seal assembly having an insert and deformble seal in the outlet passage seat, the insert and deformable seal in the outlet passage being arcuate faces eccentric to the plug to form the cam part of the means forcing the plug against the seal assembly in the inlet passage.

3. A valve as claimed in claim 2 wherein, the annular deformable seals have grooves extending the depth of the outer surfaces of the seals and spanning areas of the respective seals over which the respective adjacent ends of the plug port pass in moving to and from registry with the inlet and outlet passages, to provide passageways between the respective seals and their seats to allow pressure build-up between the seals and their respective companion inserts to pass beneath the seals and out through the pasageways between the seals and their seats.

References Cited

UNITED STATES PATENTS

| Re. 24,102 | 12/1955 | Ohls | 251—317 XR |
| 2,989,990 | 6/1961 | Bass | 251—317 XR |
| 3,118,650 | 1/1964 | Cooper | 251—317 XR |
| 3,170,669 | 2/1965 | Roos | 251—210 XR |
| 3,297,298 | 1/1967 | Sachnik | 251—317 |
| 3,322,149 | 5/1967 | Haenky | 251—192 XR |

FOREIGN PATENTS

| 619,353 | 5/1961 | Canada. |
| 690,218 | 7/1964 | Canada. |
| 704,824 | 3/1965 | Canada. |
| 1,327,279 | 4/1963 | France. |

HAROLD W. WEAKLEY, Primary Examiner

U.S. Cl. X.R.

251—163, 312, 317

Disclaimer

3,484,078.—*Norman H. Haenky*, Tulsa, Okla. VALVE. Patent dated Dec. 16, 1969. Disclaimer filed May 12, 1970, by the assignee, *FWI, Inc.*

Hereby disclaims the terminal portion of the term of the patent subsequent to May 30, 1984.

[*Official Gazette December 8, 1970.*]